United States Patent
Chen et al.

(10) Patent No.: US 11,973,236 B2
(45) Date of Patent: Apr. 30, 2024

(54) BATTERY, ELECTRIC APPARATUS AND METHOD FOR PRODUCING BATTERY

(71) Applicant: CONTEMPORARY AMPEREX TECHNOLOGY CO., LIMITED, Ningde (CN)

(72) Inventors: Yifeng Chen, Ningde (CN); Danyue Xue, Ningde (CN); Qing Wang, Ningde (CN); Shuai Ren, Ningde (CN); Binbin Chen, Ningde (CN); Xi Wang, Ningde (CN)

(73) Assignee: CONTEMPORARY AMPEREX TECHNOLOGY CO., LTD., Ningde (CN)

( * ) Notice: Subject to any disclaimer, the term of this patent is extended or adjusted under 35 U.S.C. 154(b) by 262 days.

(21) Appl. No.: 17/565,544

(22) Filed: Dec. 30, 2021

(65) Prior Publication Data

US 2022/0123410 A1 Apr. 21, 2022

Related U.S. Application Data

(63) Continuation of application No. PCT/CN2020/139597, filed on Dec. 25, 2020.

(30) Foreign Application Priority Data

Apr. 9, 2020 (CN) .......................... 202010274774.9

(51) Int. Cl.
  *H01M 50/233* (2021.01)
  *H01M 50/213* (2021.01)
(52) U.S. Cl.
  CPC ....... *H01M 50/233* (2021.01); *H01M 50/213* (2021.01); *H01M 2220/20* (2013.01)

(58) Field of Classification Search
  CPC ............. H01M 50/233; H01M 50/213; H01M 2220/20
  See application file for complete search history.

(56) References Cited

U.S. PATENT DOCUMENTS

2011/0250488 A1* 10/2011 Park ................... H01M 50/213
                                                          429/163
2011/0318634 A1    12/2011 Uh et al.
(Continued)

FOREIGN PATENT DOCUMENTS

CN    102214806 A    10/2011
CN    102299269 A    12/2011
(Continued)

OTHER PUBLICATIONS

CN 206293510 MT (Year: 2017).*
(Continued)

*Primary Examiner* — Alexander Usyatinsky
(74) *Attorney, Agent, or Firm* — Scully, Scott, Murphy & Presser, P.C.

(57) ABSTRACT

The embodiment of the present application relates to the field of battery, and in particular relates to a battery, an electric apparatus, and a method for producing a battery. The battery of the present application includes: a battery cell; a box body configured for accommodating the battery cell and comprising a sleeve, and a first end cover and a second end cover for sealing both ends of the sleeve in a height direction respectively; a first insulating member, at least part of the first insulating member being located between the first end cover and the battery cell; and a second insulating member, at least part of the second insulating member being located between the second end cover and the battery cell; where an (Continued)

inner wall of the sleeve is provided with a fixing portion configured to fix the first insulating member and the second insulating member.

14 Claims, 16 Drawing Sheets

(56) References Cited

U.S. PATENT DOCUMENTS

| | | | |
|---|---|---|---|
| 2015/0222131 A1* | 8/2015 | Kano | B60L 50/64 320/112 |
| 2016/0336556 A1 | 11/2016 | Okutani et al. | |
| 2017/0291502 A1 | 10/2017 | Kano | |
| 2019/0157851 A1* | 5/2019 | Okamoto | H01M 10/482 |

FOREIGN PATENT DOCUMENTS

| | | | |
|---|---|---|---|
| CN | 205882025 U | | 1/2017 |
| CN | 206293510 U | * | 6/2017 |
| CN | 206293510 U | | 6/2017 |
| CN | 207038609 U | | 2/2018 |
| CN | 207781669 U | | 8/2018 |
| CN | 108832049 A | | 11/2018 |
| CN | 109664744 A | | 4/2019 |
| CN | 210272481 U | * | 4/2020 |
| CN | 210272481 U | | 4/2020 |
| JP | 2011049014 A | | 3/2011 |
| KR | 20140108099 A | | 9/2014 |
| KR | 20160039252 A | | 4/2016 |
| KR | 20180113906 A | | 10/2018 |
| KR | 20200029918 A | | 3/2020 |
| WO | 2015118597 A1 | | 8/2015 |
| WO | 2019065033 A1 | | 4/2019 |

OTHER PUBLICATIONS

Decision EPO to grant a Patent (Year: 2024).*
Decision JPO to grant a Patent (Year: 2023).*
Extended European Search Report dated Oct. 20, 2022 received in European Patent Application No. EP 20929821.5.
Decision to Grant a Patent dated Aug. 14, 2023 received in Japanese Patent Application No. JP 2022-534437.
First Office Action dated May 31, 2022 received in Chinese Patent Application No. CN 202010274774.9.
Notice of Preliminary Rejection dated Dec. 15, 2023 received in Korean Patent Application No. KR 10-2022-7017273.

* cited by examiner

BATTERY, ELECTRIC APPARATUS AND METHOD FOR PRODUCING BATTERY

CROSS-REFERENCE TO RELATED APPLICATIONS

The present application is a continuation of International Application No. PCT/CN2020/139597, filed on Dec. 25, 2020, which claims the priority of the Chinese patent application numbered as 202010274774.9 and submitted on Apr. 9, 2020, which is incorporated herein by reference at its entirety.

TECHNICAL FIELD

The embodiment of the present application relates to the field of batteries, and in particular relates to a battery, an electric apparatus, and a method for producing a battery.

BACKGROUND

With increasing requirements on energy-conserving and environmental protection, in order to respond to the environmental protection policies for energy-conserving and carbon-reducing, a battery is increasingly applied in an electric vehicle and other electric apparatus.

Energy density is an important performance indicator of the battery, as the higher the energy density, the better the performance of the battery.

At present, energy density of the battery still needs to be improved.

SUMMARY

The present application provides a battery, an electric apparatus and a method for producing a battery.

The battery provided in the present application includes:
a battery cell;
a box body, configured to accommodate the battery cell and comprising a sleeve and a first end cover and a second end cover for closing both ends of the sleeve in a height direction;
a first insulating member, at least part of the first insulating member being located between the first end cover and the battery cell; and
a second insulating member, at least part of the second insulating member being located between the second end cover and the battery cell;
where an inner wall of the sleeve is provided with a fixing portion, and the fixing portion is configured to fix the first insulating member and the second insulating member.

The present application helps to reduce space occupation by disposing the fixing portion on the inner wall of the sleeve. Therefore, it is advantageous to improve energy density of the battery.

In some embodiments, the fixing portion includes a convex ridge and/or a groove.

The convex ridge not only facilitates implementation of the connection of the first insulating member and the second insulating member to the sleeve, but also performs a function of a reinforcing rib as well, which is advantageous to enhance overall strength of the battery.

In some embodiments, a side surface of the convex ridge is provided with an opening.

The side surface of the convex ridge is provided with an opening, which can reduce the risk of shrink marks caused by an excessive thickness of local material when the convex ridge is processed on the inner wall of the sleeve, which is advantageous to enhance strength of the sleeve, thus enhancing connecting reliability between the convex ridge and the sleeve. Meanwhile, appearance of the sleeve can also be improved.

In some embodiments, the opening is located at a side of the convex ridge close to the battery cell.

The opening is located at a side of the convex ridge close to the battery cell, which can ensure a structural stability and processability of the convex ridge. On the other hand, it is also more advantageous for the convex ridge to avoid the battery module, thereby further reducing space occupation and improving energy density of the battery.

In some embodiments, a distance exists between the fixing portion and at least one of both ends of the sleeve in a height direction, so that the first insulating member and/or the second insulating member are accommodated in the sleeve.

The first insulating member and the second insulating member are accommodated in the sleeve, which can make an overall structure of the battery more compact and solid.

In some embodiments, the fixing portion is connected to the first insulating member and the second insulating member through a fastener; or, the fixing portion is clamped to the first insulating member and the second insulating member.

By connecting the first insulating member to the fixing portion on the inner wall of the sleeve, relative displacement of the first insulating member and the sleeve can thus be reduced, thus improving the connecting strength and stability of the first insulating member and the box body and avoiding safety problem due to failed insulation caused by loose connection and even damage brought about by presence of the relative displacement of the first insulating member against the sleeve.

In some embodiments, the fastener includes a bolt; or, the first insulating member and the second insulating member are provided with a hook which is configured to clamp the groove of the fixing portion.

Using the bolt enables the structure simple and the assembly convenient.

In some embodiments, the fixing portion includes a first fixing portion and a second fixing portion separately arranged in a height direction of the sleeve, and the first fixing portion is configured for fixing the first insulating member, and the second fixing portion is configured for fixing the second insulating member.

Providing the first fixing portion and the second fixing portion separately can reduce weight of the entire battery and improve energy density of the battery.

In some embodiments, the first fixing portion and the second fixing portion are disposed misaligned in a length direction or width direction of the sleeve.

Disposing in a misaligned manner can achieve a better reinforcing effect for the sleeve while improving energy density.

In some embodiments, the fixing portion is further configured to fix the first end cover and the second end cover.

The fixing portion is further configured to fix the first end cover and the second end cover, which can reduce components, improve energy density and decrease cost.

The electric apparatus provided in the present application includes the battery of the present application, where the battery is configured to provide electrical energy.

A method for producing a battery provided in the present application includes the following steps:

connecting a first insulating member to a fixing portion on an inner wall of a sleeve, so that the first insulating member is fixed to the fixing portion;

placing a battery cell into the sleeve;

connecting a second insulating member to the fixing portion, so that the second insulating member is fixed to the fixing portion; and utilizing a first end cover and a second end cover to seal both ends of the sleeve in a height direction respectively.

The present application helps to reduce space occupation by disposing the fixing portion on the inner wall of the sleeve and fixing the first insulating member and the second insulating member to the fixing portion. Therefore, it is advantageous to improve energy density of the battery.

The exemplary embodiments of the present application are described in details below by referring to the following accompanying drawings, and other characteristics and their advantages of the present application will become clear.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some of the embodiments of the present application, and a person of ordinary skill in the art may still derive other drawings from these accompanying drawings without creative efforts.

DESCRIPTION OF EMBODIMENTS

Figure 1:
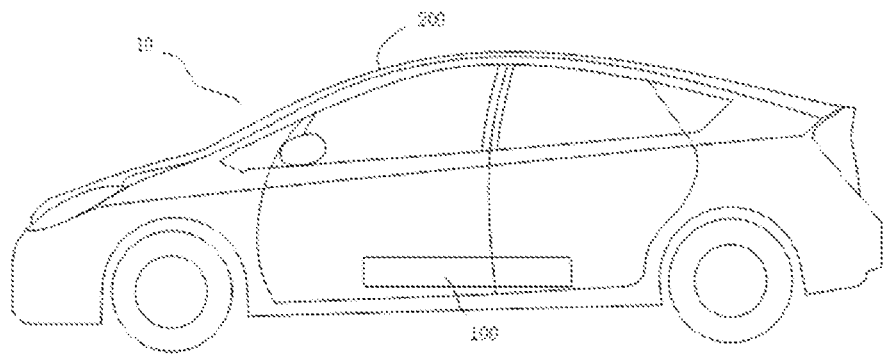
FIG. 1 is a structural diagram of an electric apparatus in embodiments of the present application.

The following clearly and completely describes the technical solutions in the embodiments of the present application with reference to the accompanying drawings in the embodiments of the present application. Apparently, the described embodiments are merely some but not all of the embodiments of the present application.

The following description on the at least one exemplary embodiment is actually illustrative only, but not to make any limitation to the present application and its application or use. All other embodiments obtained by a person of ordinary skill in the art based on the embodiments of the present application without creative efforts shall fall within the protection scope of the present application.

A technique, method and device known for a person of ordinary skill in the art is not likely to be discussed in details. However, at an appropriate situation, the technique, method and device should be regarded as a part of the granted description.

In the descriptions of the present application, it should be noted that unless otherwise described additionally, "plural" means more than two; and the orientations or positional relationships indicated by the terms "up", "down", "left", "right", "inside", "outside", and the like are merely intended to facilitate the descriptions of the present application and simplify the descriptions, but not intended to indicate or imply that the apparatuses or components mentioned must have specific orientations, or be constructed and operated for a specific orientation, and therefore shall not be understood as a limitation to the present application. In addition, the terms "first", "second" and "third" etc. are merely intended for a purpose of description, and shall not be understood as an indication or implication of relative importance. "Vertical" does not mean vertical in the strict sense, but to be vertical within a permitted range of an error. "Parallel" does not mean parallel in the strict sense, but to be parallel within a permitted range of an error.

The location words appearing in the following descriptions are all directions indicated in the drawings, but not to constitute any limitation to the specific structure of the present application. In the description of the present application, it should be further noted that unless otherwise prescribed and defined clearly, terms "mounting", "communicating" and "connection" should be understood in a broad sense, which for example can be a fixed connection and can also be a detachable connection or an integral connection; or can be a direct connection and can also be a connection through an intermediary. A person of ordinary skill in the art can understand specific meanings of these terms in the present application based on specific situations.

In addition, the technical features involved in different implementation manners of the present application as described below can be combined to each other as long as they do not constitute conflicts to each other.

Energy density is a vital property indicator of a battery for indicating energy released by an average unit volume or mass of the battery. The bigger the energy density, the better the performance of the battery.

In related arts, energy density is mostly improved by changing a structure of a battery cell in the batter and the like.

However, in the process of putting the present application into practice, the inventor found that the fixing manner of insulating members located at upper and lower sides of a battery cell in the battery also has some effects on energy density.

Based on the above discovery, improvement is made by embodiments of the present application to the structure of the battery, aiming to improve energy density of the battery.

FIG. 1 to FIG. 35 illustratively show an electric apparatus 10, a structure of a battery 100 and a method for producing a battery 100 in embodiments of the present application.

Figure 2:
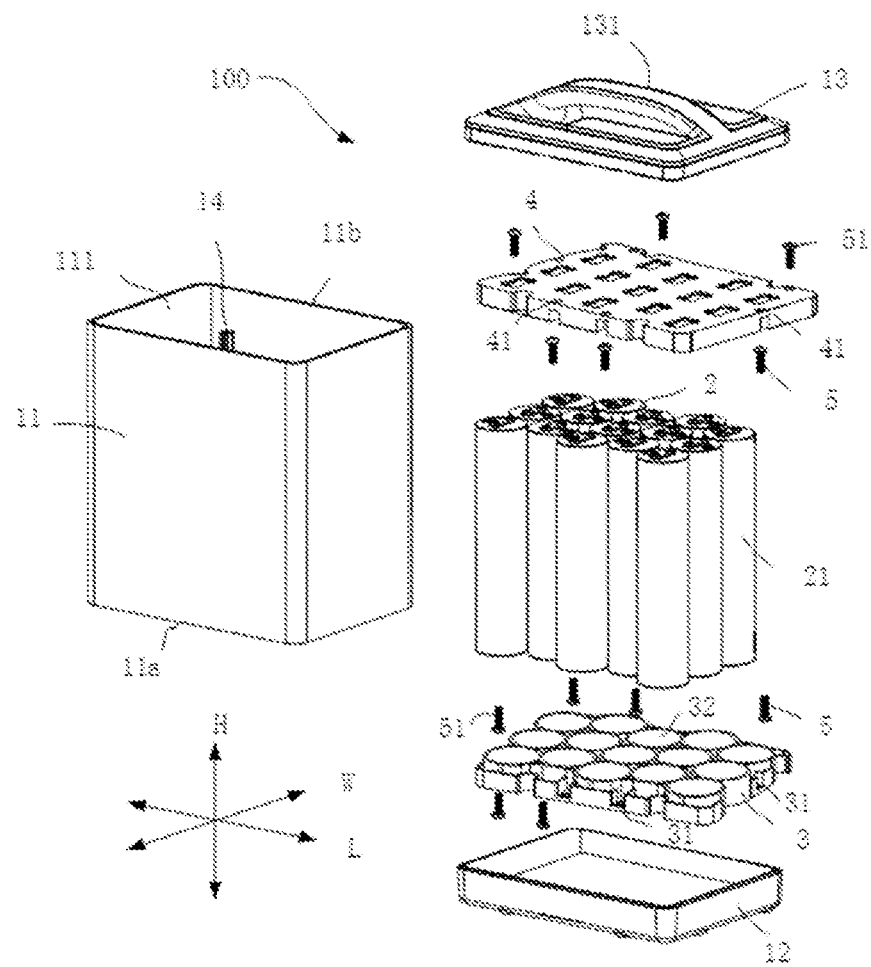
FIG. 2 is a 3D exploded view of a battery in a first embodiment of the present application.

In order to describe each location clearly below, firstly the coordinate system in FIG. 2 is used to define each direction of the battery 100, where coordinate axis H denotes a height direction of the battery 100, which is meanwhile a height direction of a box body 1 and a battery module 2 in the box body 1, known as a first direction H; coordinate axis L is perpendicular to coordinate axis H and denotes a length direction of the battery 100, which is meanwhile a length direction of the box body 1 and the battery module 2 in the box body 1, known as a second direction L; and coordinate axis W is perpendicular to coordinate axis H and coordinate axis L, and denotes a width direction of the battery 100, which is meanwhile a width direction of the box body 1 and the battery module 2 in the box body 1, known as a third direction W.

Based on the locations defined above, the nouns indicating orientations or positional relationship like "up", "down," "top" and "bottom" etc. adopted in the following descriptions are all used relative to the first direction H, where the second end cover 13 and the first end cover 12 of the battery 100 are arranged oppositely along the first direction H, the second end cover 13 is facing upwards relative to the direction of the first end cover 12, and the first end cover 12 is facing downwards relative to the direction of the second end cover 13.

However, it should be understood that the above locations defined are merely intended to facilitate the descriptions of the present application and simplify the descriptions, but not intended to indicate or imply that the apparatuses or components mentioned must have specific orientations, or be constructed and operated for a specific orientation, and therefore shall not be understood as a limitation to the present application when opposite instructions are not made.

Embodiments of the present application provide an electric apparatus using a battery as a power supply, where the electric apparatus can be a vehicle, a ship, a small aircraft, and other mobile devices, and the electric apparatus includes a power source for providing a driving force to the electric apparatus and the power source can be configured as the battery module for providing electrical energy to the electric apparatus. The driving force of the electric apparatus can all be electrical energy and can also include electrical energy and other energy (for example mechanic energy). The power source can be a battery. In addition, the electric apparatus can also be a battery cabinet and other energy storage devices. The battery cabinet can include a plurality of batteries such that the battery cabinet is capable of outputting electrical energy. Therefore, an electric apparatus shall be within the protection scope of the present application as long as the apparatus is capable of using a battery as a power supply Referring to FIG. 1, with a vehicle as an example, the electric apparatus 10 in embodiments of the present application can be a new energy vehicle, which can be a pure electric vehicle or a hybrid power vehicle or an extended-range vehicle etc., or an electric three-wheeled vehicle or a two-wheeled electric vehicle, comprising an apparatus body 200 and a battery 100. The battery 100 is disposed on the apparatus body 200 for providing electrical energy.

Next, the structure and the production method of the battery 100 are mainly introduced in embodiments of the present application by combining FIG. 2 to FIG. 35.

Referring to FIG. 2 to FIG. 34, in some embodiments, the battery 100 includes a box body 1, a battery module 2, a first insulating member 3 and a second insulating member 4.

The box body 1 is configured for accommodating the battery module 2, the first insulating member 3, the second insulating member 4 and other structural components of the battery 100, thereby providing protection for the battery module 2, the first insulating member 3, the second insulating member 4 and other structural components of the battery 100.

Figure 13:
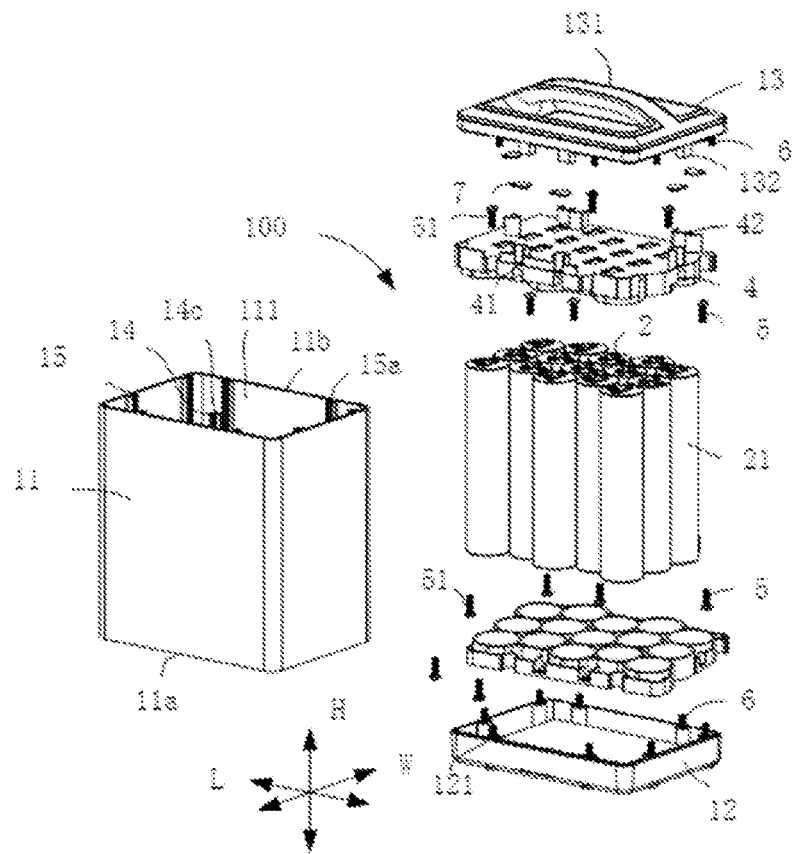
FIG. 13 is a 3D exploded view of a battery in a third embodiment of the present application.

Referring to FIG. 2 and FIG. 13, in some embodiments, the box body 1 includes a sleeve 11, a first end cover 12 and a second end cover 13. The sleeve 11 is for example an aluminum case, the inner portion of which is provided with a cavity 111, and a first end 11a and a second end 11b of the cavity 11 which are relative to each other along the first direction H are both open. The first end cover 12 and the second end cover 13 cover and enclose the first end 11a and the second end 11b of the cavity 111 respectively, enclosing the first end 11a and the second end 11b of the sleeve 11 to form an enclosed space inside the box body 11 to accommodate the battery module 2 etc. The enclosing here means to cover or close and it may be hermetical or non-hermetical.

Upon application to a two-wheeled electric vehicle or other electric apparatus 10, generally the first end cover 12 is on a lower side, and the second end cover 13 is on an upper side, that is, the first end cover 12 is a bottom cover and the second end cover 13 is a top cover. In use, by closing and opening the first end cover 12 and the second end cover 13, the battery module 2, the first insulating member 3, the second insulating member 4 and other structural components located inside the box body 1 may be maintained or replaced etc.

The shape of the box body 1 can be multiple. For example, referring to FIG. 2 and FIG. 5, in some embodiments, the box body 1 is in a shape of cube as a whole. The sleeve 11 is a hollow cubic shape with two ends open, and includes four side plates connected end to end in order. The four side plates enclose to form the cavity 111 and two adjacent side plates are perpendicular to each other. The height direction of the sleeve 11 is the first direction H. The shape of the first end cover 12 matches the shape of the port of the first end 11a of the sleeve 11. The shape of the second end cover 13 matches the shape of the port of the second end 11b of the sleeve 12.

Moreover, referring to FIG. 2, in some embodiments, the second end cover 13 is provided with a handle 131 thereon for grab while closing and opening the second end cover 13 to facilitate closing and opening of the second end cover 13.

The battery module 2 is accommodated in the cavity 111 as a core structural component of the battery 100 for powering the electric apparatus 10. The battery module 2 includes at least one battery cell 21. For example, referring to FIG. 2, in some embodiments, the battery module 2 includes a plurality of battery cells 21 arranged in a matrix. The battery cell 21 is for example of a shape of cube or cylinder or the like. In FIG. 2, the battery cells 21 are of a cylinder shape specifically and disposed misaligned. Moreover, the axial direction of the battery cell 21 is along the first direction H. At this time, two ends of the battery cell 21 provided with electrode terminals are respectively oriented towards the first end cover 12 and the second end cover 13.

At least part of the first insulating member 3 is located between the battery module 2 and the first end cover 12. At least part of the second insulating member 4 is located between the battery module 2 and the second end cover 13.

The first insulating member 3 and the second insulating member 4 are for example constructed as a harness plate and are further configured to fix a harness of the battery 100 so as to enable the harness to be more compact and ordered.

Figure 6:
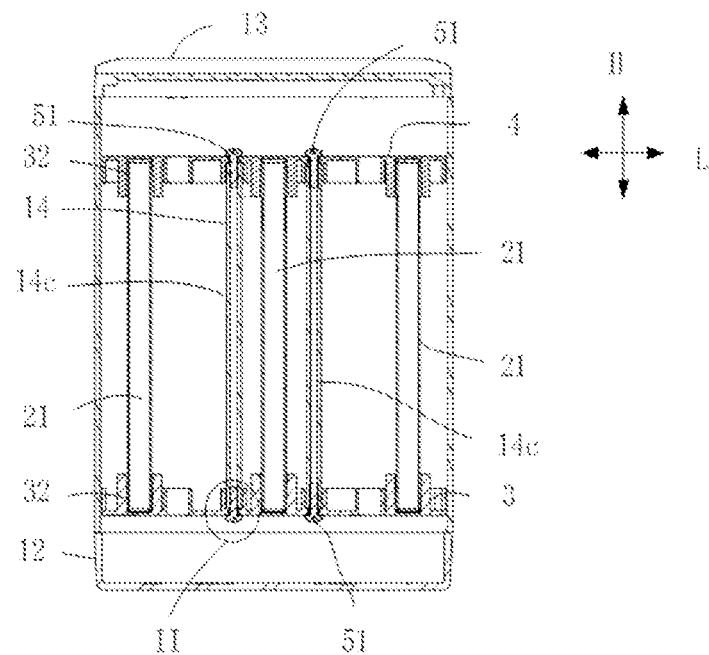
FIG. 6 is an A-A section view of FIG. 5.
Figure 7:
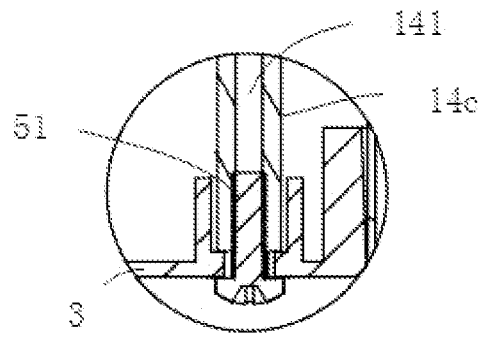
FIG. 7 is a partially enlarged view at II in FIG. 6.
Figure 8:
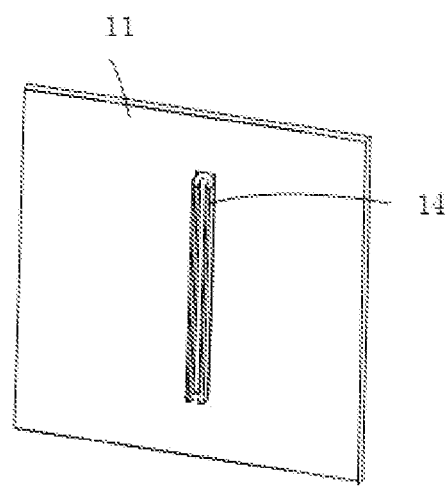
FIG. 8 is a structural diagram of a side wall of a sleeve in a second embodiment of the present application.
Figure 9:
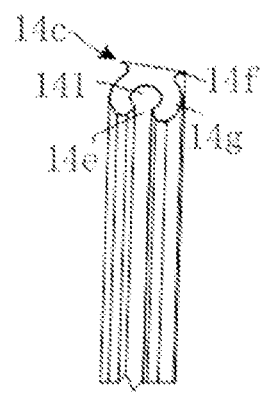
FIG. 9 is a partially 3D view of a convex ridge in FIG. 8.
Figure 10:
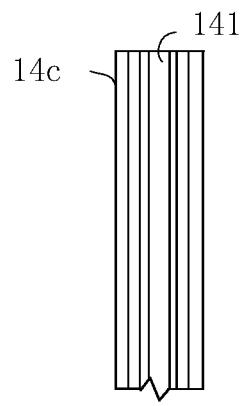
FIG. 10 is a main view of FIG. 9.
Figure 11:
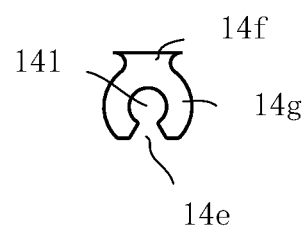
FIG. 11 is a top view of FIG. 9.
Figure 12:
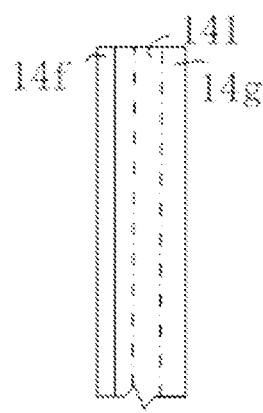
FIG. 12 is a left side view of FIG. 9.

Referring to FIG. 2 and FIG. 6, in some embodiments, the first insulating member 3 includes an accommodating groove 32 which is bijectively corresponded to the battery cell 21 and configured for an insertion of the battery cell 21 towards one end of the first end cover 12 limiting the displacement of the battery cell 21. Meanwhile, the second insulating member 4 further includes an accommodating groove 32 which is in one-to-one correspondence to the battery cell 21 and configured for an insertion of the battery cell 21 towards one end of the second end cover 13 limiting the displacement of the battery cell 21.

In embodiments of the present application, the first insulating member 3 and the second insulating member 4 are both connected to the sleeve 11.

In order to realize a connection of the first insulating member 3 to the sleeve 11, referring to FIG. 2 to FIG. 34, in some embodiments, an inner wall of the sleeve 11 is provided with a fixing portion 14, and the first insulating member 3 and the second insulating member 4 are both fixedly connected to the fixing portion 14, that is, the fixing portion 14 is configured to fix the first insulating member 3 and the second insulating member 4. In this way, the first insulating member 3 and the second insulating member 4 can be fixed by only providing the fixing portion 14 on the inner wall of the sleeve 11. Since other components other than the sleeve 11 are not required, for example, a fixing portion is additionally provided on the first end cover 12 for respectively fixing the first insulating member 3 and the second insulating member 4, thus helps to save space, for example, space along a height direction of the sleeve 11 and to improve energy density of the battery 100.

In addition, the connection of the first insulating member 3 to the inner wall of the sleeve 11 is advantageous to improve strength of the battery 100. Specifically, when the sleeve 11 is at impact, by connecting the first insulating member 3 to the fixing portion 14 on the inner wall of the sleeve 11, relative displacement of the first insulating member 3 with the sleeve 11 can be thus reduced, thus improving the connecting strength and stability of the first insulating member 3 and the box body 1 and avoiding safety problem due to failed insulation caused by loose connection and even damage brought about by presence of the relative displacement of the first insulating member 3 with the sleeve 11. An unstable fixation of the first insulating member 3 may even affect the fixation of other components (for example the battery cell 21, the busbars connecting the battery cell 21 (not shown in the drawings) and a harness (not shown in the drawings) etc.) inside the battery 100, thus causing safety problem.

Referring to FIG. 2 to FIG. 24, in some embodiments, the fixing portion 14 includes a convex ridge 14c. The convex ridge 14c protrudes from the inner wall of the sleeve 11 towards one side of the battery module 2. The disposition of the convex ridge 14c not only facilitates implementation of the connection of the first insulating member 3 and the second insulating member 4 to the sleeve 11, but also performs as a function of a reinforcing rib, which is advantageous to enhance overall strength of the battery 100.

Moreover, referring to FIG. 8 to FIG. 12, in some embodiments, a side surface of the convex ridge 14c is provided with an opening 14e. The side surface of the convex ridge 14c is a surface of the convex ridge 14c protruding toward the battery module 2 and also a surface of the convex ridge 14c connecting an upper surface and a lower surface of the convex ridge 14c. The advantages of such setting lies in capability of reducing the risk of shrink marks caused by an excessive thickness of local material when the convex ridge 14c is processed on the inner wall of the sleeve 11, which is advantageous to enhance strength of the sleeve 11, thus enhancing connecting reliability between the convex ridge 14c and the sleeve 11. Meanwhile, appearance of the sleeve 11 can also be improved.

Locating the opening 14e at any one of the side surfaces of the convex ridge 14c can perform a certain function in preventing shrink marks. When it is located at one side of the side surfaces of the convex ridge 14c close to the battery module 2, it is able to ensure a structural stability and processability of the convex ridge 14c on one hand. On the other hand, it is also more advantageous for the convex ridge 14c to avoid the battery module 2, thereby further reducing space occupation and improving energy density of the battery 100.

However, the structure of the fixing portion 14 is not limited to the above solutions. For example, referring to FIG. 25 to FIG. 30, in some embodiments, the fixing portion 14 includes a groove 14d. The groove 14d recesses from the inner wall of the sleeve 11 towards one side of an outer wall.

No matter which structural form the fixing portion 14 is constructed into, there are multiple manners of connection between the fixing portion 14, and the first insulating member 3 and the second insulating member 4, such as connection through a bolt 51, a pin (not shown in the drawings) or a screw (not shown in the drawing) or other fastener 5 (FIG. 2 to FIG. 28 and FIG. 33 to FIG. 34), or connection through clamping (FIG. 29 to FIG. 32).

In addition, the fixing portion 14 can be an integral structure. For example, referring to FIG. 2 to FIG. 20 and FIG. 33 to FIG. 34, in some embodiments, the fixing portion 14 includes an integral convex ridge 14c that extends along the first direction H; or the fixing portion 14 can also be a split structure that includes a first fixing portion 14a and a second fixing portion 14b that are disposed separately in the first direction H, where the first fixing portion 14a is connected to the first insulating member 3, and the second fixing portion 14b is connected to the second insulating member 4. For example, referring to FIG. 21 to FIG. 24, in some embodiments, the fixing portion 14 includes two sections of the convex ridge 14c that are disconnected from each other, and the two selections of the convex ridge 14c extend along the first direction H. At this time, the first fixing portion 14a and the second fixing portion 14b are both the convex ridge 14c. For example again, referring to FIG. 25 to FIG. 32, in another some embodiments, the fixing portion 14 includes two sections of the groove 14d that are disconnected from each other, and the two sections of the groove 14d extend along the first direction H. At this time, the first fixing portion 14a and the second fixing portion 14b are both the groove 14d.

Figure 21:
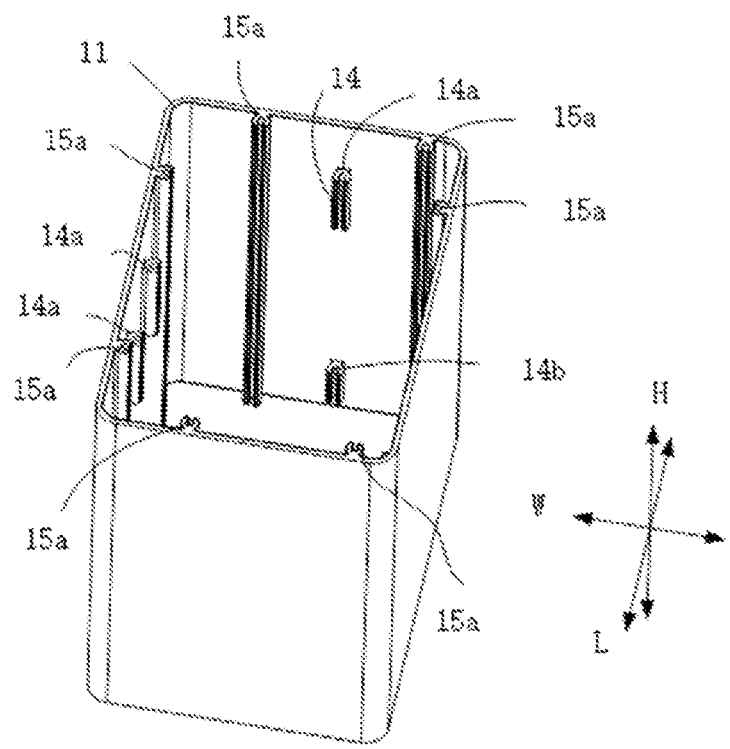
FIG. 21 is a 3D view of a sleeve in a fourth embodiment of the present application.
Figure 22:
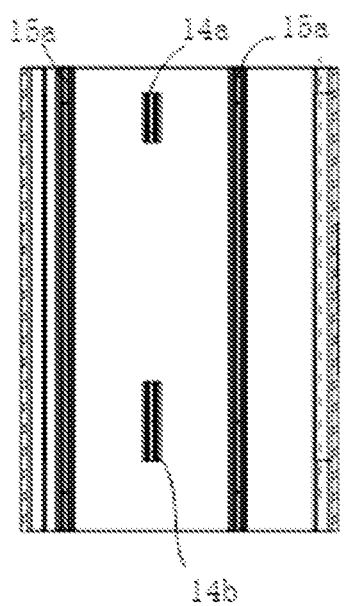
FIG. 22 is a structural diagram of a side wall of a sleeve in FIG. 21.
Figures 23, 24:
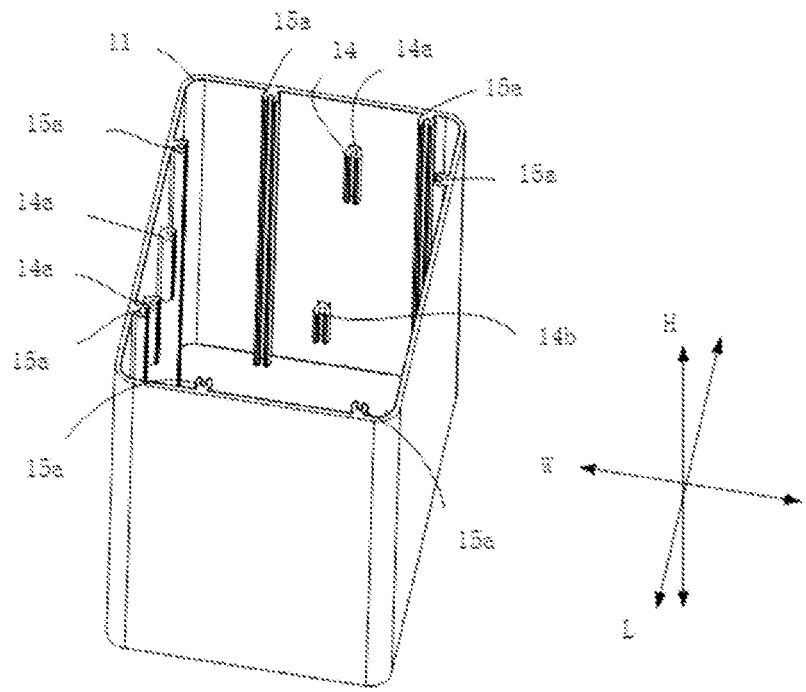
FIG. 23 is a 3D view of a sleeve in a fifth embodiment of the present application.
FIG. 24 is a structural diagram of a side wall of a sleeve in FIG. 23.
Figure 25:
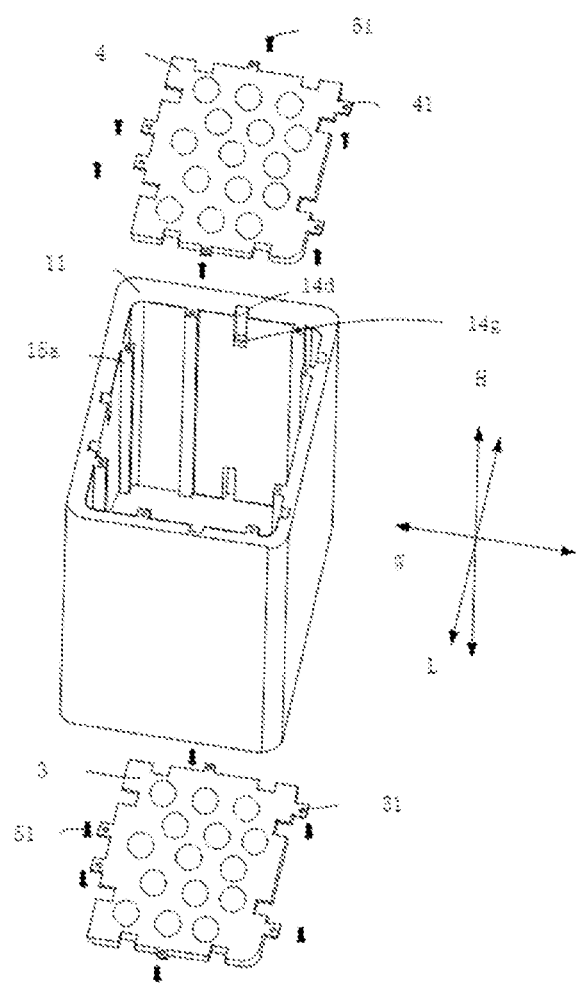
FIG. 25 is a 3D exploded view after a first end cover, a second end cover and a battery module are omitted from a battery in a sixth embodiment of the present application.
Figure 26:
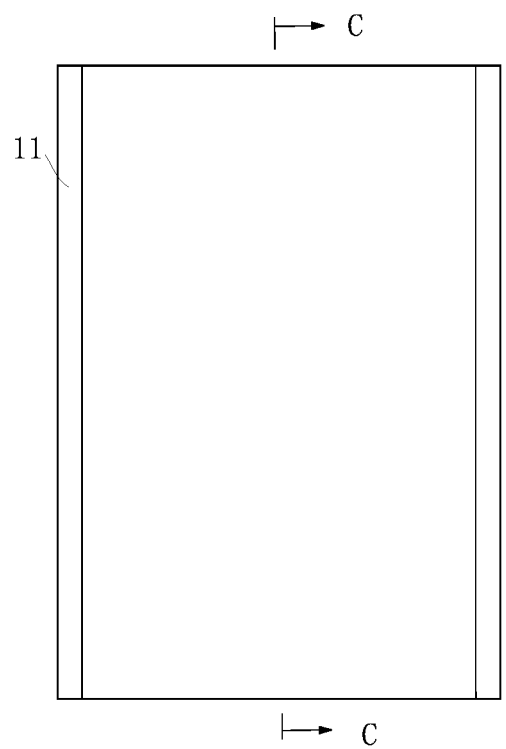
FIG. 26 is a side view of an assembly state in FIG. 25.
Figure 27:
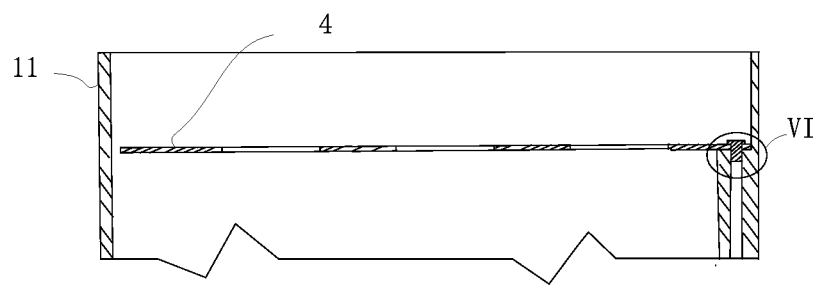
FIG. 27 is a local diagram of C-C section in FIG. 26.
Figure 28:
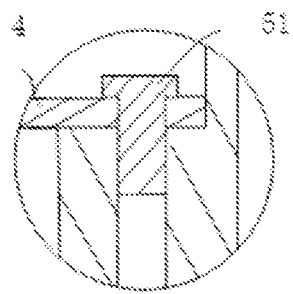
FIG. 28 is a partially enlarged view at VI in FIG. 27.

When the fixing portion 14 is a split structure, referring to FIG. 21 to FIG. 22 and FIG. 25, in some embodiments, the first fixing portion 14a and the second fixing portion 14b are disposed directly opposite to each other in a direction perpendicular to the first direction H. Referring to FIG. 23 to FIG. 24, in another some embodiments, the first fixing portion 14a and the second fixing portion 14b are disposed in a misaligned style in a direction perpendicular to the first direction H.

Each of embodiments shown in FIG. 2 to FIG. 34 will be further described respectively next.

Firstly, the first embodiment shown in FIG. 2 to FIG. 7 is introduced.

As shown in FIG. 2 to FIG. 7, in the embodiment, the fixing portion 14 disposed on the inner wall of the sleeve 11 includes a convex ridge 14c, which is constructed as a whole piece of a rib that extends along the first direction H and connected to the first insulating member 3 and the second insulating member 4 through a bolt 51.

Specifically, as shown in FIG. 2 to FIG. 7, a cross section of the convex ridge 14c is of a square shape and the convex ridge 14c is provided with a first mounting hole 141, and the first insulating member 3 and the second insulating member 4 are respectively provided with a first connecting hole 31 and a second connecting hole 41 correspondingly. The first mounting hole 141 passes through the convex ridge 14c along the first direction H. At assembly, the bolt 51 is made to pass through the first connecting hole 31 and the first mounting hole 141, in which case a fixed connection of the first insulating member 3 to the convex ridge 14c can be implemented; and the bolt 51 is made to pass through the second connecting hole 41 and the first mounting hole 141, in which case a fixed connection of the second insulating member 4 to the convex ridge 14c can be implemented. In this case, the structure is simple and the assembling is convenient.

The number of the convex ridge 14c is not limited to one. For example, side walls of four surfaces of the sleeve 11 can all be provided with the convex ridges 14c respectively. On such a basis, the circumferences of the first insulating member 3 and the second insulating member 4 can be connected to the sleeve 11 through the corresponding convex ridge 14c, resulting a better solid connection and stability.

Figure 3:
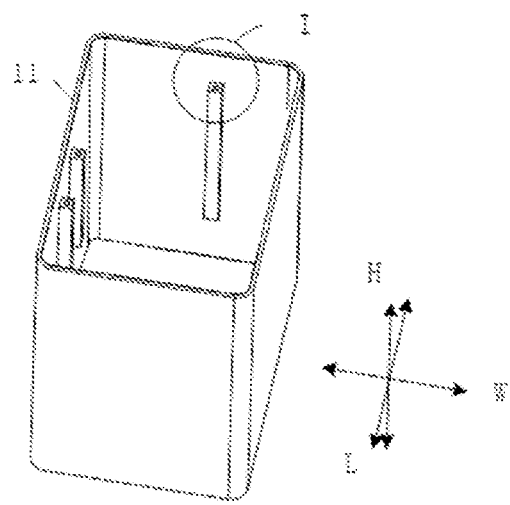
FIG. 3 is a 3D view of a sleeve in FIG. 2.
Figure 4:
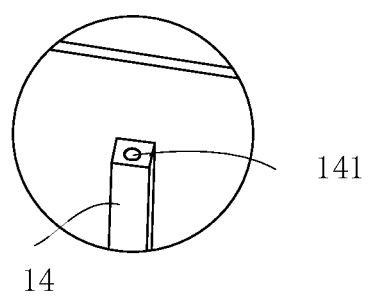
FIG. 4 is a partially enlarged view of I in FIG. 3.
Figure 5:
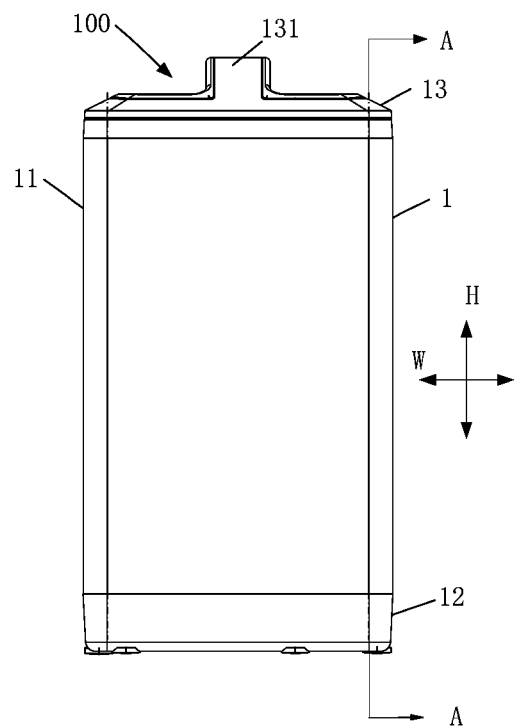
FIG. 5 is a side view of a battery in FIG. 2.

Meanwhile, as shown in FIG. 3 and FIG. 6, in the embodiment, a distance exists between the convex ridge 14c, and the first end 11a and the second end 11b of the sleeve 11, that is, in the first direction H, the convex ridge 14c is not aligned with the first end 11a and the second end 11b of the sleeve 11, but to be located between the first end 11a and the second end 11b. In this way, the first insulating member 3 and the second insulating member 4 are both at least partially located in the sleeve 11, which makes the overall structure of the battery 100 more compact and solid. Moreover, a circuit board (not shown in the drawings), a harness (not shown in the drawings) and other components may also be placed between the second insulating member 4 and the second end cover 13. Thus, a distance exists between the convex ridge 14c, and the first end 11a and the second end 11b of the sleeve 11 facilitating the accommodation of the circuit board, the harness and other components in the sleeve 11, which is advantageous for protection of those components more sufficiently when the battery 100 is at impact.

As a variant, in other embodiments, the convex ridge 14c can also have a distance with one of the first end 11a and the second end 11b and be aligned with the other of the first end 11a and the second end 11b; that is, the fixing portion 14 can have a distance with at least one end of the two ends of the sleeve 11 in the height direction, or, two ends of the convex ridge 14c can also be aligned with the first end 11a and the second end 11b of the sleeve 11 respectively.

Next, the second embodiment shown in FIG. 8 to FIG. 12 is introduced.

In order to simplify descriptions, only differences between the second embodiment and the first embodiment are mainly described herein.

As shown in FIG. 8 to FIG. 12, in the embodiment, one end of the convex ridge 14c close to the battery module 2 is provided with an opening 14e, that is, the opening 14e is located at one side of a side surface of the convex ridge 14c close to the battery module 2 to prevent generation of shrink marks, enhance strength, avoid the battery cell 21 and improve energy density.

Meanwhile, as shown in FIG. 9 to FIG. 12, in the embodiment, the convex ridge 14c includes a first convex ridge portion 14f and a second convex ridge portion 14g, the first convex ridge portion 14f connects the second convex ridge portion 14g to an inner wall of the sleeve 11 and a cross section of the convex ridge 14c becomes narrower at a connecting place of the first convex ridge portion 14f and the second convex ridge portion 14g, that is, the connecting place of the first convex ridge portion 14f and the second convex ridge portion 14g is narrower relative to other portions of the convex ridge 14c. Such setting has advantage of helping to reduce the material of the convex ridge 14c, making the thickness of the walls of the convex ridge 14c even, and reducing the risk of shrink marks appearing to the sleeve 11 due to excessive thickness of the convex ridge 14c, thus helping to improve the connecting strength of the convex ridge 14c with the first insulating member 3 and the second insulating member 4 as well as the strength of the sleeve 11 itself.

In the embodiment, the first end cover 12 and the second end cover 13 can be detachably connected to the sleeve 11. On such a basis, as compared with a case in which the first end cover 12 and the sleeve 11 are an integral structure, since the first end cover 12 can be connected to the sleeve 11 after the first insulating member 3 is connected to the sleeve 11, thus it is more convenient for connection of the first insulating member 3 to the sleeve 11, which not only helps to reduce assembly difficulty of the battery 100 and improve assembly efficiency of the battery 100, but also helps to reduce reserved space between the battery module 2 and the box body 1 for mounting the first insulating member 3, thus further improving energy density of the battery 100.

When assembling the battery 100, for example, firstly the fastener 5 is used to lock and attach the first insulating member 3 to the convex ridge 14c from a lower side, thus realizing a detachable connection of the first insulating member 3 to the sleeve 11. Then, the battery module 2 is placed into the sleeve 11 and the fastener 5 is used to lock and attach the second insulating member 4 to the convex ridge 14c, thus realizing a detachable connection of the second insulating member 4 to the sleeve 11. Then, the first end cover 12 and the second end cover 13 are connected onto the sleeve 11 to complete the assembly of the battery 100. In the process, it is not necessary to dip tools inside the box body 1 for operation, such that it is simple and convenient. Moreover, it is not necessary to dispose more operation space between the battery module 2 and the box body 1 for mounting the first insulating member 3, thus implementing a high space utilization rate and high energy density of the battery 100.

Next, the third embodiment shown in FIG. 13 to FIG. 20 is introduced.

Figure 14:
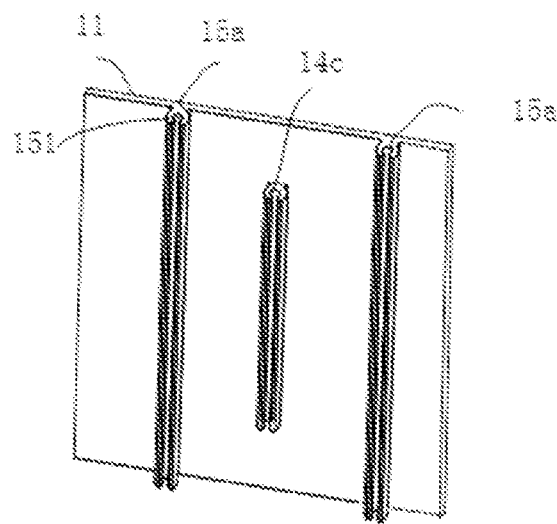
FIG. 14 is a structural diagram of a side wall of a sleeve in FIG. 13.
Figure 15:
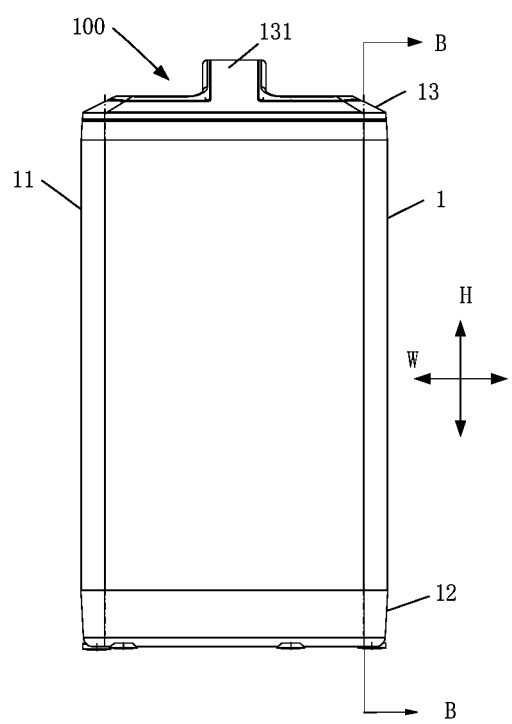
FIG. 15 is a side view of a battery shown in FIG. 13.

As shown in FIG. 13 and FIG. 14, in the embodiment, the inner wall of the sleeve 11 is not only provided with the convex ridge 14c used as the fixing portion 14, but also simultaneously provided with a connecting portion 15, which connects the first end cover 12 to the second end cover 13, and specifically includes a connecting rib 15a, which protrudes from the inner wall of the sleeve 11 towards one side of the battery module 2.

The disposed connecting rib 15a helps to further improve the strength of the battery 100. Moreover, since the connecting rib 15a is located in the sleeve 11, thus it also helps to reduce space occupation and improve energy density relative to a situation in which a connecting part of the first end cover 12 and the second end cover 13 with the sleeve 11 is located outside the sleeve. Meanwhile, setting the connecting rib 15a to connect the sleeve 11 to the first end cover 12 and the second end cover 13 also facilitates implementation of a detachable connection between the first end cover 12 and the second end cover 13, and the sleeve 11, thus helping to further reduce assembling difficulty of the battery 100 and increase energy density of the battery 100.

Figure 16:
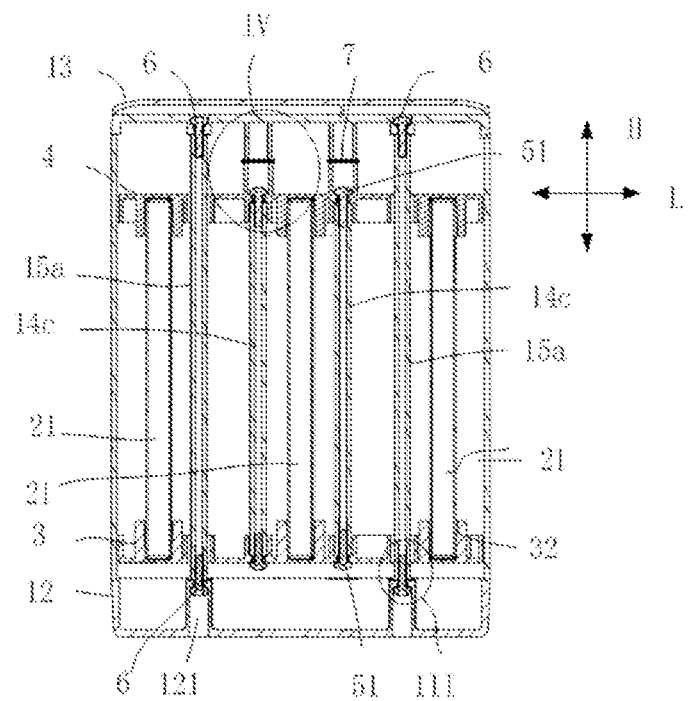
FIG. 16 is a B-B section view of FIG. 15.
Figure 17:
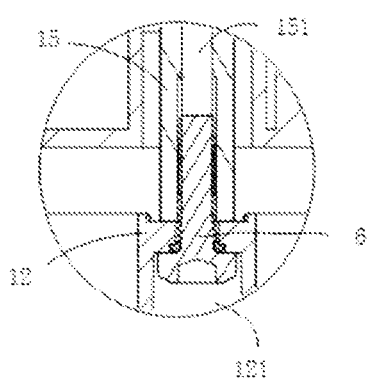
FIG. 17 is a partially enlarged view at III in FIG. 16.

Specifically, as shown in FIG. 13 and FIGS. 16-17, in the embodiment, the first end cover 12 and the second end cover 13 are both connected to the connecting rib 15a through a connecting piece 6. More specifically, as shown in FIG. 14 and FIG. 17, the connecting rib 15a is provided with a second mounting hole 151, and the first end cover 12 and the second end cover 13 are both provided with a coordinating hole 121 corresponding to the second mounting hole 151. The second mounting hole 151 for example passes through the connecting rib 15a along the first direction H. The connecting piece 6 is for example a bolt 51, a pin (not shown in the drawing) or a screw (not shown in the drawings), and it is for example further coated with a thread locker (not shown in the drawings) to perform a function of increasing connecting strength and sealing performance etc. In this way, the connecting piece 6 passes through the coordinating hole 121 and the second mounting hole 151 on the first end cover 12, thus realizing a detachable connection of the first end cover 12 to the sleeve 11 conveniently. The connecting piece 6 passes through the coordinating hole 121 and the second mounting hole 151 on the second end cover 13, thus realizing a detachable connection of the second end cover 13 to the sleeve 11 conveniently.

Since a detectable connection of the first end cover 12 and the second end cover 13 to the sleeve 11 can be implemented conveniently by only utilizing a same connecting rib 15a, thus the structure is simple and the connection is convenient.

As shown in FIG. 14, in the embodiment, the connecting rib 15a is similar with the convex ridge 14c in structure, for example, both being provided with an opening 14e. For example again, the cross section becomes narrower at a connecting place of the first convex ridge portion 14f and the second convex ridge portion 14g.

Meanwhile, as shown in FIG. 14, the connecting rib 15a also differs from the convex ridge 14c in some points. For example, the connecting rib 15a does not have a distance between two ends of the sleeve 11 in the height direction, as the connecting rib 15a is substantially aligned with two ends of the sleeve 11 in the height direction, that is, the connecting rib 15a substantially extends from the first end 11a of the sleeve 11 to the second end 11b. On such a basis, the convex ridge 14c and the connecting rib 15a differ from each other in height. According to the height of the convex ridge 14c and the connecting rib 15a, they can be distinguished from each other conveniently, thus rapidly determining the orientations to place the first insulating member 3, the second insulating member 4, the first end cover 12 and the second end cover 13 in the process of assembling the battery 100, so as to improve an assembling efficiency. Meanwhile, different heights of the convex ridge 14c and the connecting rib 15a are more adaptive to the fixing requirements of the insulating member and end cover at different heights, thus helping to implement a more efficient assembly of the battery 100.

It can be seen that ribs of different heights are disposed on the sleeve 11 for connecting and fixing the insulating member and the end cover respectively, so as to effectively increase energy density of the battery 100, but also to help to improve an assembling efficiency of the battery 100.

Figure 19:
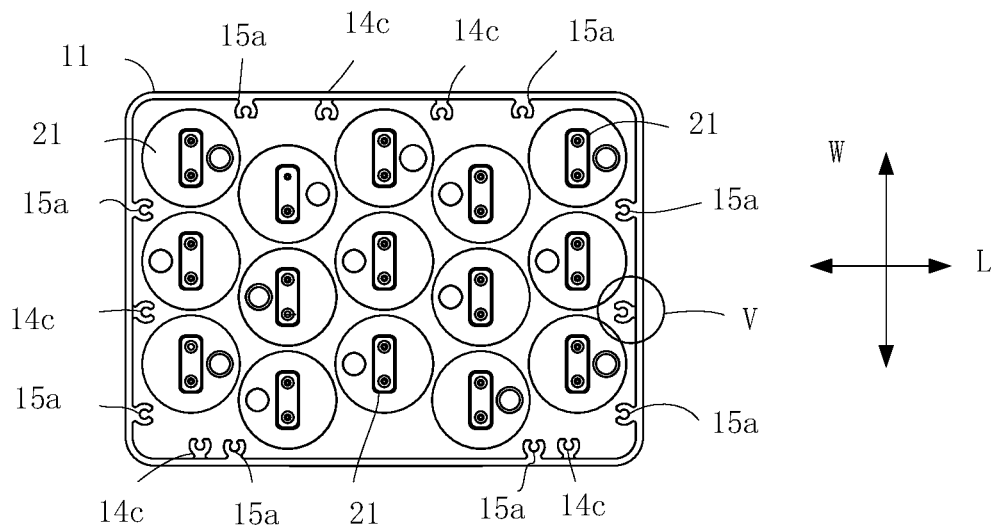
FIG. 19 is a vertical view after a second end cover and a second insulating member are omitted from a battery shown in FIG. 13.

As shown in FIG. 19, in the embodiment, four side walls of surfaces of the sleeve 11 are all provided with the convex ridge 14c and the connecting rib 15a simultaneously, such that the circumferences of the first insulating member 3 and the second insulating member 4 are both connected to the sleeve 11, ensuring an uniform stress of the first insulating member 3 and the second insulating member 4. Moreover, the circumferences of the first end cover 12 and the second end cover 13 are both connected to the sleeve 11 as well, sealing effects of the battery 100 are improved and the overall structure of the battery 100 also becomes more solid and stable.

Arranging the convex ridge 14c and the connecting rib 15a on the inner wall of the sleeve 11 is convenient to avoid the battery cell 21.

Figure 20:
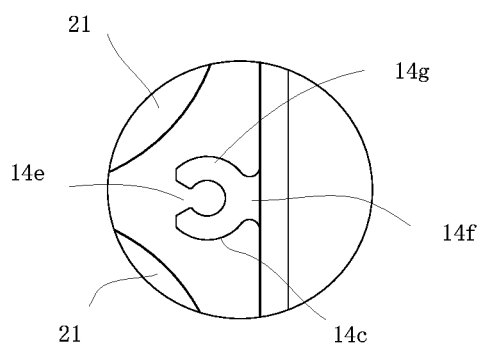
FIG. 20 is a partially enlarged view at V in FIG. 19.

In order to further reduce space occupation, as shown in FIG. 19 and FIG. 20, in the embodiment, on a direction perpendicular to the first direction H, some of the convex ridge 14c and the connecting rib 15a are located between two adjacent battery cells 21 of the battery module 2, that is, along the second direction L or the third direction W, the convex ridge 14c and the connecting rib 15a protrude towards a portion between the adjacent two battery cells 21. In this way, the convex ridge 14c and the connecting rib 15a do not need to occupy additional space in the second direction L or the third direction W. Therefore, internal space of the battery 100 can be further improved and energy density of the battery 100 is thus further improved.

In addition, referring to FIG. 19, in the embodiment, the second insulating member 4 is further abutted against the second end cover 13. Since the second end cover 13 is capable of further limiting displacement of the second insulating member 4 in this case, thus it further helps to improve the stability of the overall structure of the battery 100.

Figure 18:
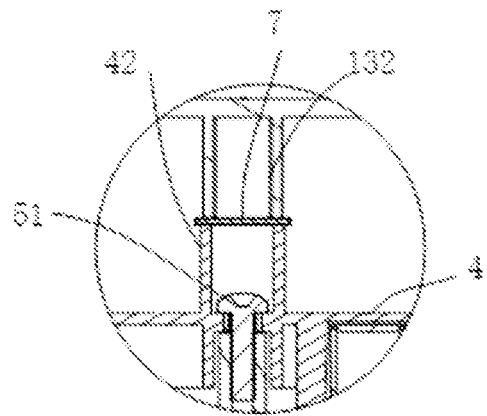
FIG. 18 is a partially enlarged view at IV in FIG. 16.

Moreover, as shown in FIG. 13, FIG. 16 and FIG. 18, in the embodiment, a foam or other buffer 7 is further provided between the abutting parts of the second insulating member 4 and the second end cover 13, that is, the second insulating member 4 is provided with a buffer 7 and the second end cover 13 abuts against the buffer 7. The advantages of setting the buffer 7 lie in a capability of the buffer 7 for establishing a size tolerance of the second insulating member 4 and the second end cover 13 on one hand so as to improve the abutting effect between the second insulating member 4 and the second end cover 13, and on the other hand, the buffer 7 enables no requirement of direct rigid contact between the second insulating member 4 and the second end cover 13, thus helping to reduce an abrasion between the second insulating member 4 and the second end cover 13.

Specifically, as shown in FIG. 13, FIG. 16 and FIG. 18, in the embodiment, a surface of the second end cover 13 facing towards one side of the second insulating member 4 is provided with a first boss 132, which protrudes towards one side of the second insulating member 4. Meanwhile, a surface of the second insulating member 4 facing towards one side of the second end cover 13 is correspondingly provided with a second boss 42, which protrudes towards one side of the second end cover 13. After an assembly is completed, the first boss 132 abuts against the second boss 42, that is, an abutting portion of the second end cover 13 and the second insulating member 4 is located at the first boss 132 and the second boss 42. At this time, the buffer 7 can be disposed between the first boss 132 and the second boss 42, that is, the buffer 7 is disposed on the second boss 42, and the first boss 132 abuts against the buffer 7.

Although not shown, it can be understood that in other embodiments, a buffer 7 can be further provided between the first insulating member 3 and the first end cover 12 to improve an abutting effect between the first insulating member 3 and the first end cover 12, and reduce an abrasion between the first insulating member 3 and the first end cover 12.

Next, two embodiments shown in FIG. 21 to FIG. FIG. 22 and FIG. 23 to FIG. 24 are introduced.

As shown in FIG. 21 to FIG. 24, the two embodiments are variants of the embodiment shown in FIG. 13 to FIG. 20, and they mainly differ from the embodiment shown in FIG. 13 to FIG. 20 in that the fixing portion 14 is not an integral structure any longer, but to be constructed as a split structure.

As shown in FIG. 22 to FIG. 24, in the two embodiments, the fixing portion 14 includes a first fixing portion 14a and a second fixing portion 14b that are disconnected from each other in the first direction H, and the first fixing portion 14a and the second fixing portion 14b are specifically constructed as a convex ridge. In other words, although the fixing portion 14 in the two embodiments is still the convex ridge 14c, it is not an entire piece of the convex ridge, but to be split into two sections of the disconnected convex ridge. In this way, the weight of the entire battery can be reduced and energy density of the battery can be improved.

The difference lies in that in the embodiment shown in FIG. 21 to FIG. 22, the first fixing portion 14a and the second fixing portion 14b are disposed directly opposite to each other in a direction perpendicular to the first direction H, that is, the first fixing portion 14a and the second fixing portion 14b are disposed directly opposite to each other in the length direction L or the width direction W of the sleeve 11. In the embodiment shown in FIG. 23 to FIG. 24, the first fixing portion 14a and the second fixing portion 14b are staggered to be disposed in a direction perpendicular to the first direction H, that is, the first fixing portion 14a and the second fixing portion 14b are disposed misaligned in the length direction L or the width direction W of the sleeve 11. Disposing in a misaligned manner can achieve a better reinforcing effect for the sleeve 11 while improving energy density.

In the previous embodiments, the fixing portion 14 is constructed as a convex ridge 14c. However, as described above, the fixing portion 14 can practically be constructed as a groove 14d or other structural forms as well. Next, the embodiments shown in FIG. 25 to FIG. 28 are combined for description.

As shown in FIG. 25 to FIG. 28, in the embodiment, the fixing portion 14 includes a groove 14d, which recesses from the inner wall of the sleeve 11 to one side of an outer wall. Moreover, specifically, the groove 14d is still connected to the first insulating member 3 and the second insulating member 4 through a bolt 51 or other fastener 5.

More specifically, the fixing portion 14 includes two grooves 14d that are disposed separately in the first direction H. An inner wall between the two grooves 14d is provided with a fixing hole 14g matched with both a first connecting hole 31 on the first insulating member 3 and a second connecting hole 41 on the second insulating member 4, and the bolt 51 passes through the fixing hole 14g and the first connecting hole 31 or the second connecting hole 41, to implement a connection between the first insulating member 3 or the second insulating member 4 with the fixing portion 14.

In some embodiments, of the embodiments described above, the first insulating member 3 and the second insulating member 4 are connected to the fixing portion 14 through the fastener 5. Next, by combining FIG. 26 to FIG. 29, the clamping between the first insulating member 3 and the second insulating member 4, and the fixing portion 14 is described.

Figure 29:
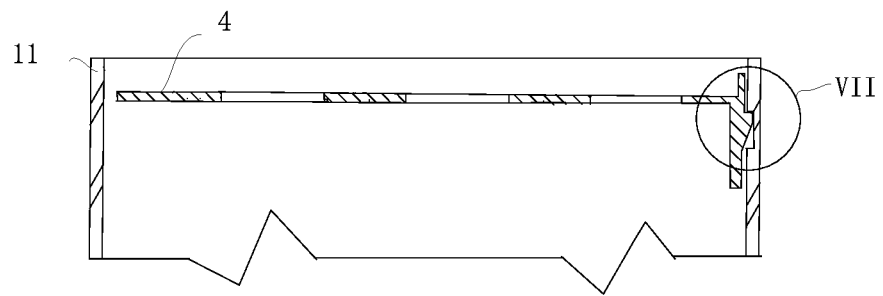
FIG. 29 is a coordinating diagram of a second insulating member and a sleeve in a seventh embodiment of the present application.
Figure 30:
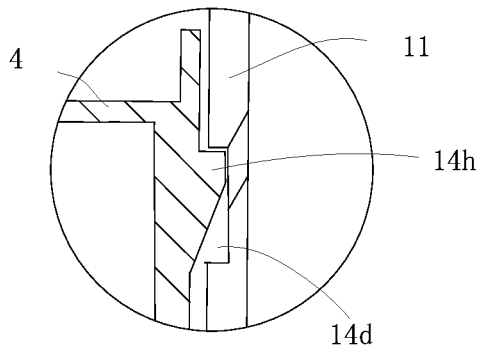
FIG. 30 is a partially enlarged view at VII in FIG. 29.

In the embodiments shown in FIG. 29 to FIG. 30, the fixing portion 14 includes a groove 14d and the first insulating member 3 and the second insulating member 4 are provided with a hook 14h, which is clamped to the groove 14d, such that the clamping between the first insulating member 3 and the second insulating member 4, and the fixing portion 14 can be implemented.

Figure 31:
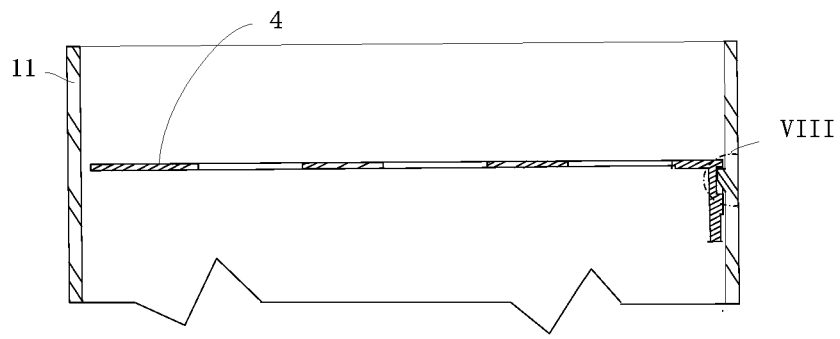
FIG. 31 is a coordinating diagram of a second insulating member and a sleeve in an eighth embodiment of the present application.
Figure 32:
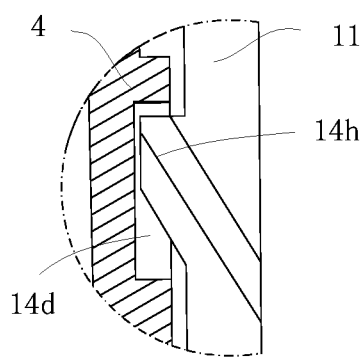
FIG. 32 is a partially enlarged view at VIII in FIG. 31.
Figure 33:
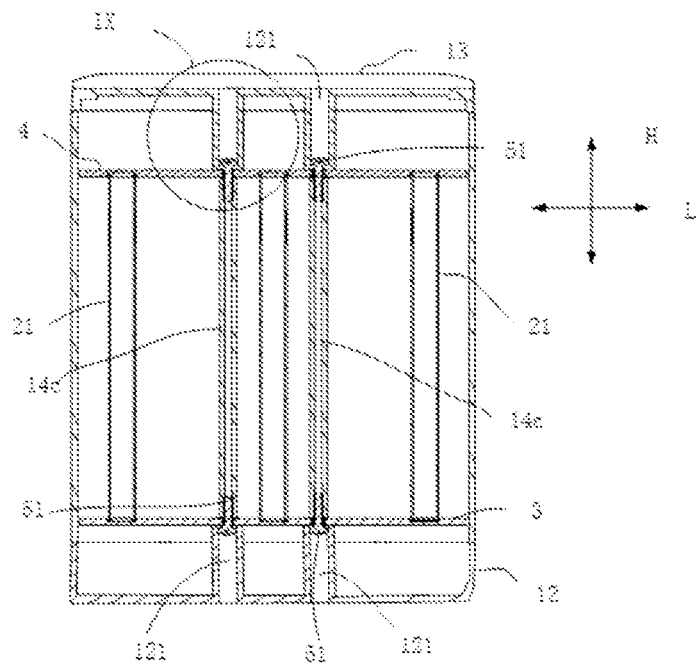
FIG. 33 is a longitudinal section view of a battery in a ninth embodiment of the present application.
Figure 34:
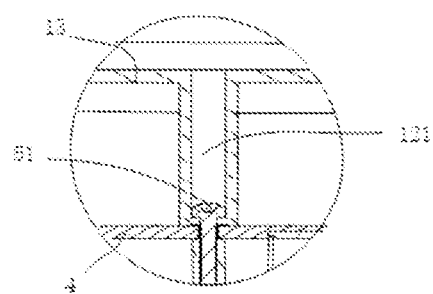
FIG. 34 is a partially enlarged view at IX in FIG. 33.

In the embodiments shown in FIG. 31 to FIG. 32, the positions for disposing the groove 14d and the hook 14h are exchanged, that is, the fixing portion 14 includes a hook 14h and the first insulating member 3 and the second insulating member 4 are provided with a groove 14h, which is clamped to the groove 14d, in which case the clamping between the first insulating member 3 and the second insulating member 4, and the fixing portion 14 can also be implemented.

In addition, in each embodiment shown in FIG. 2 to FIG. 28, the fixing portion 14 is not simultaneously connected to the first end cover 12 and the second end cover 13, the first end cover 12 and the second end cover 13 are connected to the sleeve 11 through the connecting portion 15 or other structures other than the fixing portion 14. However, actually, the first end cover 12 and the second cover 13 can also be connected onto the fixing portion 14. For example, in the embodiment shown in FIG. 33 to FIG. 34, the first end cover 12, the second end cover 13, the first insulating member 3 and the second insulating member 4 are all connected to the convex ridge 14c used as the fixing portion 14, that is, the fixing portion 14 is not only used to fix the first insulating member 3 and the second insulating member 4, but also fix the first end cover 12 and the second end cover 13. At this time, it is not necessary to additionally dispose the connecting portion 15 other than the fixing portion 14, in which case connection of the first end cover 12 and the second end cover 13 to the sleeve 11 can be implemented, thus reducing components, improving energy density and reducing cost.

Figure 35:
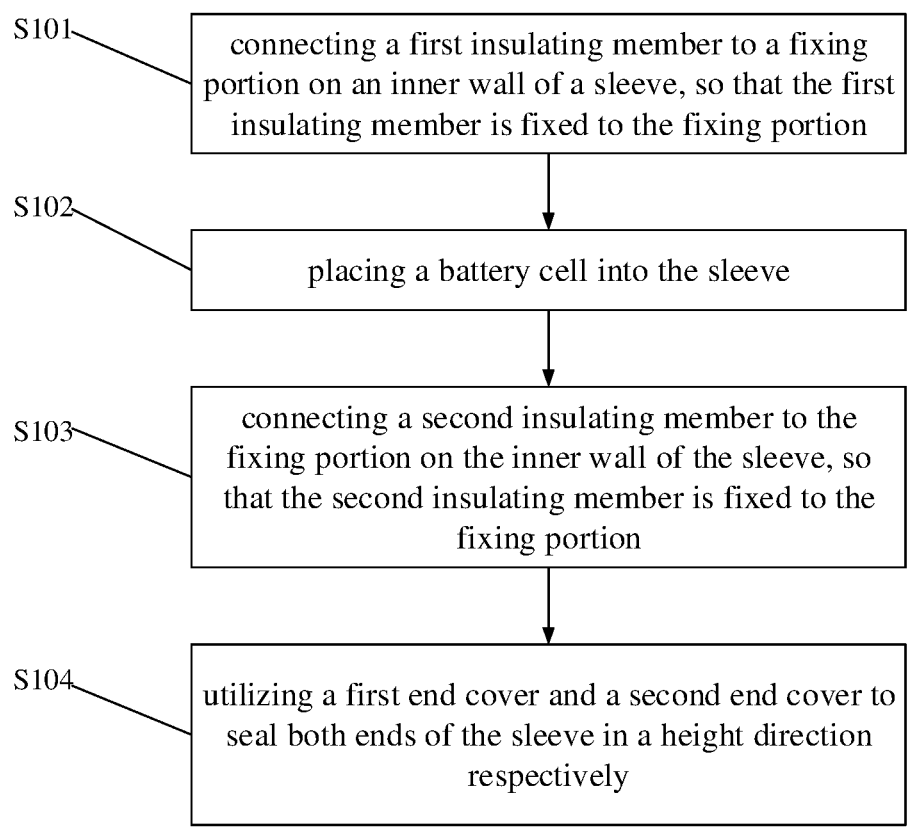
FIG. 35 is an assembling method of a battery in embodiments of the present application.

Referring to FIG. 35, embodiments of the present application further provide a method for producing a battery (100), comprising following steps:

S101: connecting a first insulating member 3 to a fixing portion 14 on an inner wall of a sleeve 11, so that the first insulating member 3 is fixed to the fixing portion 14;

S102: placing a battery cell 21 into the sleeve 11;

S103: connecting a second insulating member 4 to the fixing portion 14, so that the second insulating member 4 is fixed to the fixing portion 14; and S104: utilizing a first end cover 12 and a second end cover 13 to seal both ends of the sleeve 11 in a height direction respectively.

The above steps can be adjusted. For example, in some embodiment, the step S102 can also be implemented before the step 101; or the sequence of the step S103 and the step S101 can be switched.

With the production method in embodiments of the present application, it is not necessary for the first insulating member 3 and the second insulating member 4 to be firstly assembled with each battery cell 21, then assembled onto the box body 1 as an integral structure, but rather to firstly assemble each battery cells 21, then fix the first insulating member 3 and the second insulating member 4 onto the sleeve 11, such that the insulating member and the battery module 2 can be respectively assembled onto the box body 1, ensuring a more convenient and efficient assembly.

Meanwhile, based on the production method in the embodiments of the present application, it is also convenient to maintain the battery 100. After the insulating member and the battery module 2 are assembled as a whole, and then placed into the box body 1, when it is necessary to maintain the battery cell 21, it is necessary to dismount the first insulating member 3, the battery module 2 and the second insulating member 4 which have been integrated into a whole structure from the box body 1, which involves complexity and troubles. However, in the embodiments of the present application, maintenance of the battery module 2 can be implemented as it is only necessary to take one of the first insulating member 3 and the second insulating member 4 out from the battery module 2, which is simpler and more efficient.

The foregoing descriptions are merely exemplary embodiments of the present application, but are not intended to limit the present application. Any modification, equivalent replacement, or improvement or parameters made without departing from the spirit and principle of the present application shall fall within the protection scope of the present application.

What is claimed is:

1. A battery, comprising:
a battery cell;
a box body, configured to accommodate the battery cell and comprising a sleeve and a first end cover and a second end cover for sealing both ends of the sleeve in a height direction respectively;
a first insulating member, at least part of the first insulating member being located between the first end cover and the battery cell; and
a second insulating member, at least part of the second insulating member being located between the second end cover and the battery cell;
wherein an inner wall of the sleeve is provided with a fixing portion, and the fixing portion is configured to fix the first insulating member and the second insulating member;
wherein the fixing portion is clamped to the first insulating member and the second insulating member; and
wherein the first insulating member and the second insulating member are provided with a hook, and the hook is configured to clamp the groove of the fixing portion.

2. The battery according to claim 1, wherein the fixing portion comprises a convex ridge.

3. The battery according to claim 2, wherein a side surface of the convex ridge is provided with an opening.

4. The battery according to claim 3, wherein the opening is located at a side of the convex ridge close to the battery cell.

5. The battery according to claim 1, wherein the fixing portion comprises a groove.

6. The battery according to claim 1, wherein a distance exists between the fixing portion and at least one of both ends of the sleeve in the height direction, so that the first insulating member and/or the second insulating member are accommodated in the sleeve.

7. The battery according to claim 1, wherein the fixing portion comprises a first fixing portion and a second fixing portion separately arranged in the height direction of the sleeve, and the first fixing portion is configured to fix the first insulating member, and the second fixing portion is configured to fix the second insulating member.

8. The battery according to claim 7, wherein the first fixing portion and the second fixing portion are staggered to be disposed in a length direction or width direction of the sleeve.

9. The battery according to claim 1, wherein the fixing portion is further configured to fix the first end cover and the second end cover.

10. An electric apparatus, comprising:
a battery, comprising:
a battery cell;
a box body, configured to accommodate the battery cell and comprising a sleeve and a first end cover and a second end cover for sealing both ends of the sleeve in a height direction respectively;
a first insulating member, at least part of the first insulating member being located between the first end cover and the battery cell; and
a second insulating member, at least part of the second insulating member being located between the second end cover and the battery cell;
wherein an inner wall of the sleeve is provided with a fixing portion, and the fixing portion is configured to fix the first insulating member and the second insulating member;
wherein the fixing portion is clamped to the first insulating member and the second insulating member;
wherein the first insulating member and the second insulating member are provided with a hook, and the hook is configured to clamp the groove of the fixing portion; and
wherein the battery is configured to provide electrical energy.

11. The electric apparatus according to claim 10, wherein the fixing portion comprises a convex ridge.

12. The electric apparatus according to claim 11, wherein a side surface of the convex ridge is provided with an opening.

13. The electric apparatus according to claim 12, wherein the opening is located at a side of the convex ridge close to the battery cell.

14. A method for producing a battery, comprising following steps:

connecting a first insulating member to a fixing portion on an inner wall of a sleeve, so that the first insulating member is fixed to the fixing portion;

placing a battery cell into the sleeve;

connecting a second insulating member to the fixing portion, so that the second insulating member is fixed to the fixing portion, wherein the fixing portion is clamped to the first insulating member and the second insulating member;

wherein the first insulating member and the second insulating member are provided with a hook, and the hook is configured to clamp the groove of the fixing portion; and utilizing a first end cover and a second end cover to seal both ends of the sleeve in a height direction respectively.

* * * * *